(12) United States Patent
Ukeji

(10) Patent No.: US 11,748,041 B2
(45) Date of Patent: Sep. 5, 2023

(54) RECORDING APPARATUS, CONTROL METHOD, AND STORAGE MEDIUM

(71) Applicant: CANON KABUSHIKI KAISHA, Tokyo (JP)

(72) Inventor: Nobutaka Ukeji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/507,610

(22) Filed: Oct. 21, 2021

(65) Prior Publication Data

US 2022/0129210 A1 Apr. 28, 2022

(30) Foreign Application Priority Data

Oct. 26, 2020 (JP) .................................. 2020-179124

(51) Int. Cl.
*G06F 3/12* (2006.01)
*H04N 1/00* (2006.01)

(52) U.S. Cl.
CPC .......... *G06F 3/1204* (2013.01); *G06F 3/1254* (2013.01); *H04N 1/00676* (2013.01)

(58) Field of Classification Search
None
See application file for complete search history.

(56) References Cited

U.S. PATENT DOCUMENTS

| 2002/0054350 | A1* | 5/2002 | Kakigi | ............... H04N 1/00132 |
| | | | | 358/1.16 |
| 2013/0141750 | A1* | 6/2013 | Suzuki | ................... G06F 3/1235 |
| | | | | 358/1.14 |
| 2021/0373491 | A1* | 12/2021 | Tanaka | ................. G03G 15/205 |

FOREIGN PATENT DOCUMENTS

| JP | H08151162 A | 6/1996 |
| JP | 2001199138 A | 7/2001 |
| JP | 2005089026 A | 4/2005 |
| JP | 2018140847 A | 9/2018 |

* cited by examiner

*Primary Examiner* — Frantz Bataille
(74) *Attorney, Agent, or Firm* — Canon U.S.A., Inc. I.P. Division

(57) ABSTRACT

A recording apparatus includes a recording unit, first and second sheet discharge portions to which recorded products each recorded with an image are discharged, an acquisition unit, a determination unit, and a reception unit. The recording unit records the image by imparting recording materials. The acquisition unit acquires a recording job instructing recording of the image. The determination unit determines, in a case where sheet discharge destination information included in the recording job indicates the first sheet discharge portion, whether a recorded product of an n-th page is dischargeable to the first sheet discharge portion, wherein n is greater than or equal to one. The reception unit receives, in a case where a result of the determination by the determination unit is that recorded product is not dischargeable to the first sheet discharge portion, an instruction about recording of the n-th page from a user.

19 Claims, 9 Drawing Sheets

FIG.6

| RECORDING SETTING | VALUE | AVAILABILITY OF TOP-SURFACE SHEET DISCHARGE |
|---|---|---|
| SHEET TYPE | REGULAR PAPER | AVAILABLE |
| SHEET TYPE | THICK PAPER | UNAVAILABLE |
| SHEET TYPE | GLOSSY PAPER | UNAVAILABLE |
| CUT MODE SETTING | CUT | AVAILABLE |
| CUT MODE SETTING | NO CUT | UNAVAILABLE |

RECORDING APPARATUS, CONTROL METHOD, AND STORAGE MEDIUM

BACKGROUND

Field

The present disclosure relates to a recording apparatus that records an image on a recording medium, a method for controlling the recording apparatus, and a storage medium.

Description of the Related Art

A recording apparatus that includes a plurality of sheet discharge portions as sheet discharge destinations to which sheets each recorded with an image are discharged has been known. In some of recording apparatuses, a sheet size, a sheet type, etc. dischargeable to each of the sheet discharge portions are determined based on a mechanism and a function of each of the sheet discharge portions.

Japanese Patent Application Laid-Open No. 2005-89026 discusses a technique in which it is determined whether a sheet can be discharged to a designated sheet discharge destination based on recording setting before the sheet is conveyed to the sheet discharge destination, and in a case where the sheet cannot be discharged, other sheet discharge destinations are searched in a predetermined order in a similar manner, to determine a sheet discharge destination to which the sheet can be discharged.

SUMMARY

According to an aspect of the present disclosure, a recording apparatus includes a recording unit configured to record an image by imparting recording materials, a first sheet discharge portion and a second sheet discharge portion to which recorded products each recorded with the image are discharged, an acquisition unit configured to acquire a recording job instructing recording of the image, a determination unit configured to determine, in a case where sheet discharge destination information included in the recording job indicates the first sheet discharge portion, whether a recorded product of an n-th page is dischargeable to the first sheet discharge portion, wherein n is greater than or equal to one, and a reception unit configured to receive, in a case where a result of the determination by the determination unit is that recorded product is not dischargeable to the first sheet discharge portion, an instruction about recording of the n-th page from a user.

Further features of the present disclosure will become apparent from the following description of exemplary embodiments with reference to the attached drawings.

BRIEF DESCRIPTION OF THE DRAWINGS

FIG. 6 illustrates an example of recording setting in which top-surface sheet discharge is unavailable, according to the first exemplary embodiment.

DESCRIPTION OF THE EMBODIMENTS

Some exemplary embodiments of the present disclosure are described below with reference to drawings.

Figure 1:
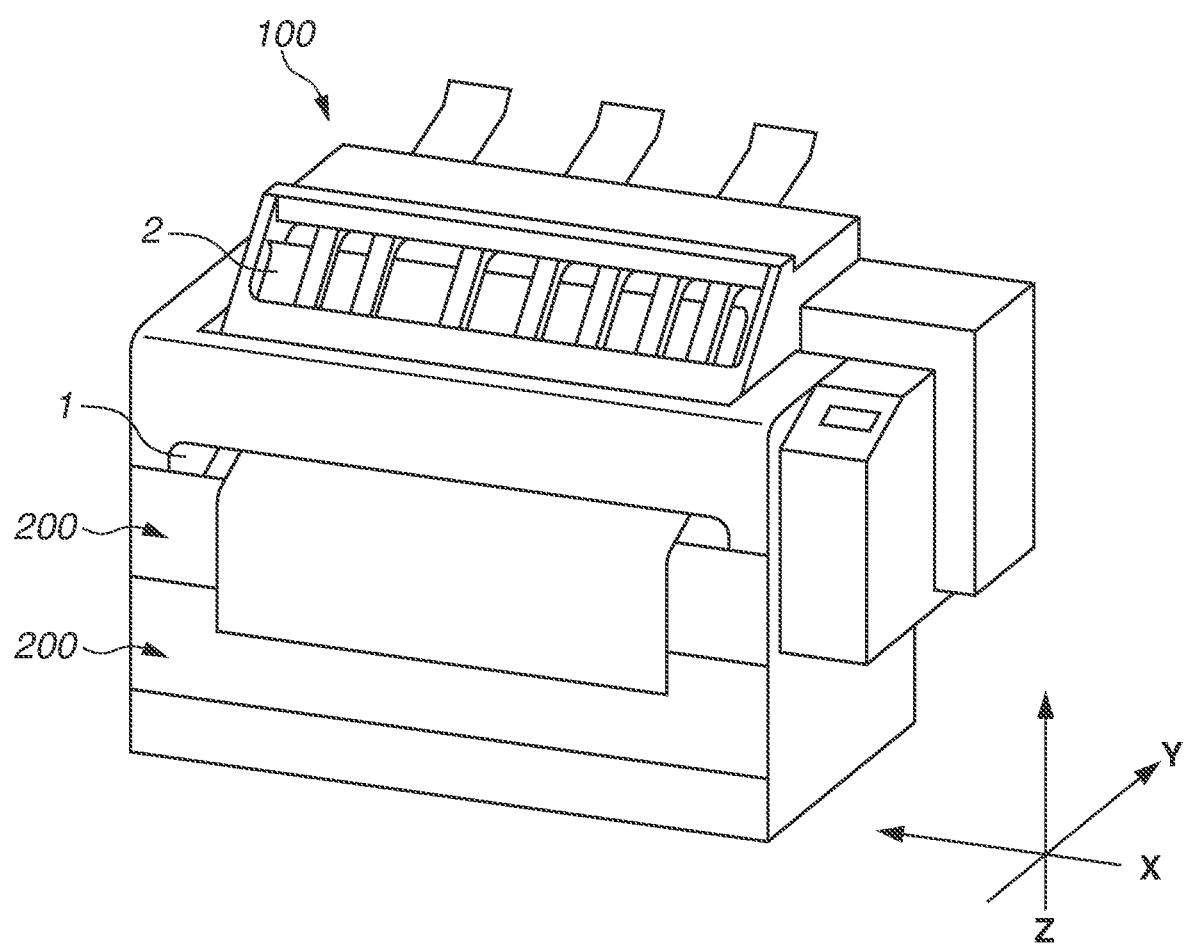
FIG. 1 is a perspective view of a recording apparatus.

FIG. 1 is a perspective view of a recording apparatus 100 according to a first exemplary embodiment. The recording apparatus 100 according to the present exemplary embodiment is an inkjet recording apparatus that uses ink as recording materials, and forms dots on a recording medium (sheet) by ejecting ink droplets to record an image. The recording apparatus 100 according to the present exemplary embodiment uses a roll sheet wound in a roll shape. When the roll sheet is supplied to a roll sheet supplying apparatus 200, the sheet is fed to a recording position by a sheet feeding unit (not illustrated). At the recording position, an image is recorded by repeating conveyance of the roll sheet and scanning with ejection of ink droplets from an inkjet head 151 filled with the ink. The roll sheet recorded with the image is discharged to a front-surface sheet discharge portion (basket, not illustrated) disposed below the recording position, through a front-surface sheet discharge port 1.

The recording apparatus 100 according to the present exemplary embodiment can discharge a recorded product recorded with the image, to a top-surface sheet discharge portion (stacker, not illustrated) disposed above the recording position, through a top-surface sheet discharge port 2. In the following description, discharge of a sheet from the front-surface sheet discharge port 1 is referred to as "front-surface sheet discharge" or "to discharge sheet to front surface", and discharging of a sheet from the top-surface sheet discharge port 2 is referred to as "top-surface sheet discharge" or "to discharge sheet to top surface".

In FIG. 1, the recording apparatus 100 only having a recording function is illustrated; however, the recording apparatus 100 is not limited thereto. The recording apparatus 100 may function as a copying machine by further including a reading apparatus reading an image of a document, or may be a multifunctional peripheral including the other functions.

Figure 2:
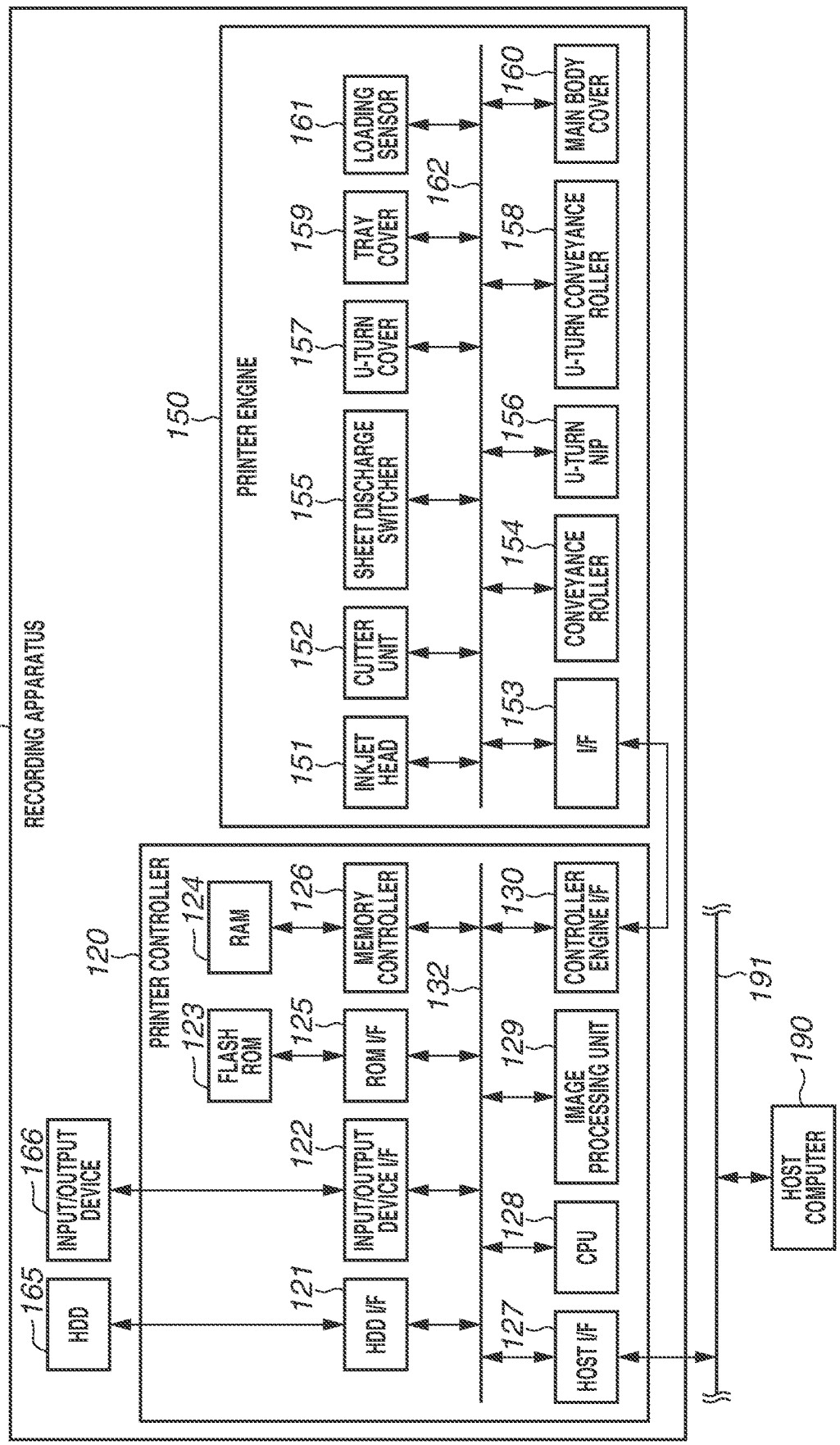
FIG. 2 is a block diagram illustrating a configuration of the recording apparatus.

FIG. 2 is a block diagram illustrating a control configuration of the recording apparatus 100. The recording apparatus 100 includes a printer controller 120, a printer engine 150, a hard disk drive (HDD) 165, and an input/output device 166, and is connectable to a host computer 190 through a network 191. The printer controller 120 includes an HDD interface (I/F) 121, an input/output device I/F 122, a read only memory (ROM) I/F 125, and a memory controller 126. The printer controller 120 further includes a host I/F 127, a central processing unit (CPU) 128, an image processing unit 129, and a controller engine I/F 130. These units are connected to one another via a printer controller system bus 132. The printer controller 120 further includes a flash ROM 123 and a random access memory (RAM) 124. The flash ROM 123 and the RAM 124 are connected to the printer controller system bus 132 respectively through the ROM I/F 125 and the memory controller 126.

The CPU 128 is a central processing unit in a form of a microprocessor (microcomputer), and controls operation of the entire recording apparatus 100 through execution of programs and activation of hardware. The flash ROM 123 stores programs to be executed by the CPU 128 and fixed data necessary for various kinds of operation of the recording apparatus 100. The RAM 124 is used as a work area of the CPU 128 or as a temporary storage area of various received data. Further, the RAM 124 can store various kinds of setting data.

The image processing unit 129 performs various kinds of image processing. Examples of the various kinds of image processing include processing to develop recording data handled by the recording apparatus 100 to image data, and processing to convert data described by a page description language into bitmap image data. The image processing unit 129 converts a color space (e.g., YCbCr color space) of image data included in input recording data into a standard RGB color space (e.g., sRGB color space). Further, various image processing such as resolution conversion to the number of pixels recordable by the recording apparatus 100, image analysis, and image correction is performed on the image data as necessary. The image data obtained by the image processing is stored in the RAM 124 or the HDD 165.

The printer engine 150 includes the inkjet head 151, a cutter unit 152, and an interface 153 for the printer controller 120. The printer engine 150 further includes a conveyance roller 154, a sheet discharge switcher 155, a U-turn nip 156, a U-turn cover 157, a U-turn conveyance roller 158, a tray cover 159, a main body cover 160, and a loading sensor 161. These units are connected to one another through a printer engine system bus 162.

The inkjet head 151 records an image by imparting the ink to a sheet based on image data. The inkjet head 151 according to the present exemplary embodiment holds four recording heads corresponding to four colors of cyan, magenta, yellow, and black. The inkjet head 151 records the image on the sheet by causing the recording heads of the respective colors to eject ink droplets in synchronization with conveyance of the sheet.

The cutter unit 152 is a mechanism for cutting the sheet, and cuts the sheet having an image recorded thereon into a predetermined length. The conveyance roller 154 is a roller conveying the sheet and is controlled by the CPU 128. The sheet discharge switcher 155 is a mechanism that forms a sheet discharge path when the sheet is discharged to the front-surface sheet discharge portion or the top-surface sheet discharge portion of the recording apparatus 100, and is controlled by the CPU 128.

The U-turn nip 156 is a mechanism for pressing the sheet when the sheet is discharged to the top-surface sheet discharge portion, and is controlled by the CPU 128. The U-turn cover 157 is a mechanism that forms a sheet conveyance path when the sheet is discharged to the top-surface sheet discharge portion, and is controlled by the CPU 128. The U-turn conveyance roller 158 is a roller conveying the sheet when the sheet is discharged to the top-surface sheet discharge portion, and is controlled by the CPU 128. The main body cover 160 is a mechanism on which the sheet is loaded when the sheet is discharged to the top-surface sheet discharge portion. The tray cover 159 is a mechanism for pressing the sheet from above.

The loading sensor 161 is an optical sensor, and detects whether a sheet has been loaded on the top-surface sheet discharge portion of the main body cover 160, from change of a light shielding state or a transmission state of the sensor. The HDD 165 can store or read out programs to be executed by the CPU 128, recording data, setting information necessary for various kinds of operation of the recording apparatus 100 in/from a built-in hard disk. Another large-capacity storage device may be used in place of the HDD 165.

The input/output device 166 includes hardware keys and a touch panel to receive an instruction from a user, and a display unit to present (notify) various information to the user. When presenting information to the user, the input/output device 166 can present the information by output of sounds (buzzer, voice, etc.) from a sound generator based on sound information.

In the present exemplary embodiment, the recording apparatus 100 includes the input/output device 166, however, the configuration is not limited thereto, and the input/output device 166 may be provided outside the recording apparatus 100. In this case, the input/output device 166 is connected by wireless communication, etc. Further, the host computer 190 may also function as the input/output device 166. In addition to the input/output device 166, other input/output devices may be further connectable to the recording apparatus 100 through a network, etc.

The host computer 190 is, for example, an external apparatus that serves as a recording data supply source. In place of the host computer 190, other recording data supply sources such as an image reader, a digital camera, and a smartphone may be connected to the recording apparatus 100.

Figure 3:
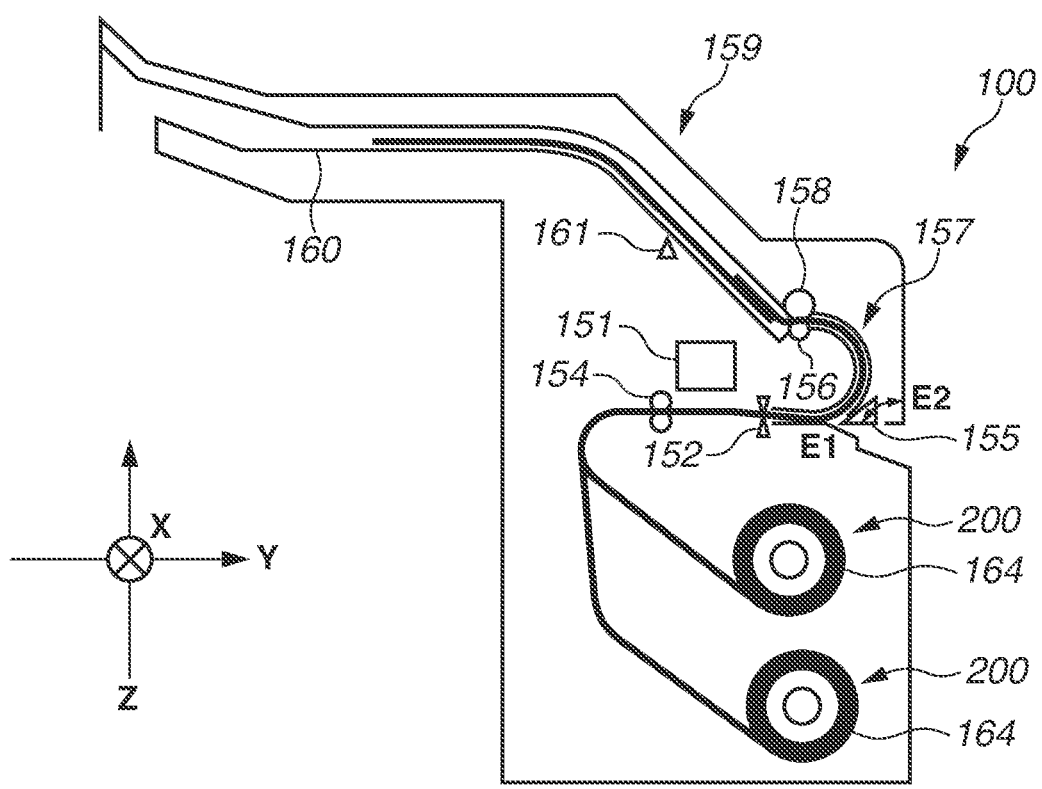
FIG. 3 is a cross-sectional view of the recording apparatus.

FIG. 3 is a cross-sectional view of the recording apparatus 100. When a roll sheet 164 is set in the roll sheet supplying apparatus 200 and the roll sheet is supplied, a leading edge of the roll sheet 164 is conveyed to a position facing the inkjet head 151 by the conveyance roller 154. When the leading edge of the roll sheet 164 is conveyed to the recording position where the inkjet head 151 can impart the ink, the ink droplets are ejected from the inkjet head 151, and an image is recorded on the roll sheet 164. As described above, the recording apparatus 100 according to the present exemplary embodiment is a serial recording inkjet recording apparatus. Accordingly, the ink ejection operation by the inkjet head 151 and the conveyance operation by the conveyance roller 154 are repeated until a tail end of the image.

The sheet discharge switcher 155 is a component that forms a conveyance path to discharge the roll sheet 164 from the top-surface sheet discharge port 2 or the front-surface sheet discharge port 1 of the recording apparatus 100. In a case where the roll sheet 164 is discharged from the front-surface sheet discharge port 1, the sheet discharge switcher 155 is driven to a position E2 before the ink ejection operation starts. As a result, the conveyance path to the top surface of the recording apparatus 100 is blocked, and the leading edge of the roll sheet 164 is conveyed to the front surface of the recording apparatus 100. In a case where the roll sheet 164 is discharged from the top-surface sheet discharge port 2, the sheet discharge switcher 155 is driven to a position E1 before the ink ejection operation starts. As a result, the leading edge of the roll sheet 164 is conveyed to the top surface along the sheet discharge switcher 155.

When the recording is completed up to the tail end of the image and cut mode setting in the recording setting is set so as to cut the sheet, the cutter unit 152 cuts the sheet at the tail end of the image. A recorded product after the sheet is cut at the tail end of the image is nipped by the U-turn conveyance roller 158 and the U-turn nip 156, is conveyed inside the U-turn cover 157, and is discharged to a space between the tray cover 159 and the main body cover 160. After the recorded product is discharged to the stacker which is the top-surface sheet discharge portion of the recording apparatus 100, the loading sensor 161 detects that the recorded product is loaded on the stacker.

Here, setting in which the top-surface sheet discharge is available and setting in which the front-surface sheet discharge is available are described. In a case of the top-surface sheet discharge, the sheet discharge switcher 155 is set to the position E1, and the sheet is conveyed inside the U-turn cover 157 and is discharged to the top surface of the recording apparatus 100. A sheet having high rigidity, such as a thick paper, is difficult to be conveyed inside the U-turn cover 157. Accordingly, in a case where such a sheet type is set in the recording setting, it is determined that the top-surface sheet discharge is unavailable. In contrast, in the case of the front-surface sheet discharge, the sheet discharge switcher 155 is set to the position E2, and difficulties of the conveyance path, etc. do not arise. Therefore, in the recording apparatus 100 according to the present exemplary embodiment, the front-surface sheet discharge is available irrespective of the sheet type.

In a case where the cut mode setting is set such that the cutter unit 152 does not cut the sheet after the image recording, if the sheet is discharged to the top surface without being cut, the sheet is difficult to be handled thereafter, which increases a burden of the user. Therefore, in the present exemplary embodiment, it is determined that the top-surface sheet discharge is available in a case where the cut mode setting is set so as to cut the roll sheet. In contrast, in the recording apparatus 100 according to the present exemplary embodiment, the front-surface sheet discharge is available in both the case where the cut mode setting is set so as to cut the roll sheet and the case where the cut mode setting is set so as not to cut the roll sheet.

As described above, in the recording apparatus 100 according to the present exemplary embodiment, the sheet discharge destination can be set from the plurality of candidates including the top surface and the front surface. Even in the case where the top surface is set as the sheet discharge destination, the top-surface sheet discharge is unavailable depending on the other settings. In contrast, in the case where the front surface is set as the sheet discharge destination, the front-surface sheet discharge is available irrespective of the other settings.

Figure 4:
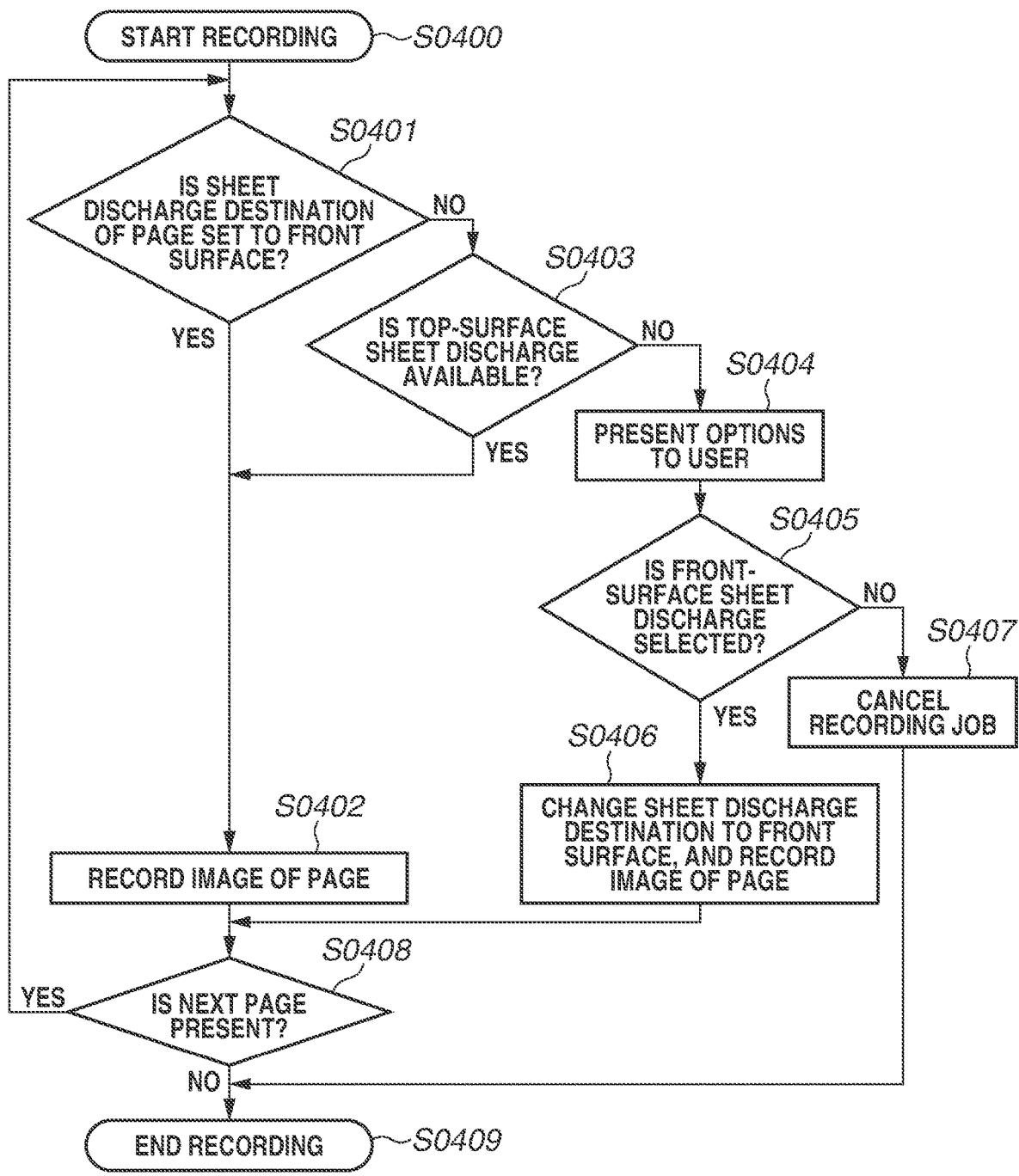
FIG. 4 is a flowchart illustrating processing according to a first exemplary embodiment.

FIG. 4 is a flowchart illustrating image recording processing. Programs of the flowchart are held in the flash ROM 123 and are controlled by the CPU 128. In the present exemplary embodiment, the programs are previously held in the flash ROM 123, however, programs similar to the programs of the flowchart may be installed in the RAM 124 and controlled by the CPU 128.

In the processing, the recording setting is determined for recording of each page. In a case where the top surface is set as the sheet discharge destination in the recording setting but where it is determined that the top-surface sheet discharge is unavailable, options are presented to the user. Note that a recording command issued to the recording apparatus 100 by the user is referred to as a "recording job", and a section after cutting determination until next cutting determination based on the cut mode setting is referred to as a "page". The recording job includes a recording start command, image data, recording setting, and a recording end command. In the processing, a processing target page is an n-th (n≥1, n is natural number) page, and the recording job includes image data for m (m>n, m is natural number and is greater than n) pages.

Figure 5:
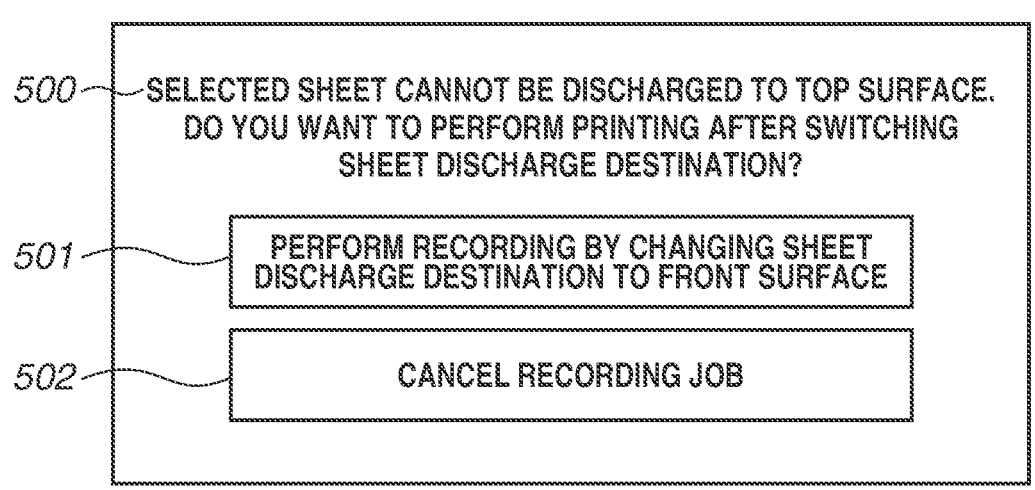
FIG. 5 illustrates an example of a selection screen according to the first exemplary embodiment.

In step S0400, when the user operates the input/output device 166 to instruct start of recording, a recording job is acquired and the recording processing is started. First, in step S0401, it is determined whether the sheet discharge destination of the n-th (n≥1) page included in the recording job from the user is set to the front surface. In a case where the sheet discharge destination is set to the front surface (YES in step S0401), the sheet can be discharged irrespective of the recording setting. Therefore, an image of the n-th page is recorded in step S0402. In a case where the sheet discharge destination is set to the top surface (NO in step S0401), the sheet cannot be discharged depending on a condition included in the recording setting. Thus, in step S0403, it is determined whether the top-surface sheet discharge is available based on the recording setting. In a case where it is determined that the top-surface sheet discharge is available based on the recording setting (YES in step S0403), the image of the page is recorded in step S0402. In a case where the recording setting includes a condition in which the top-surface sheet discharge is unavailable, it is determined in step S0403 that the top-surface sheet discharge is unavailable (NO in step S0403). In step S0404, options are presented to the user. FIG. 5 illustrates an example of a selection screen presented to the user, and FIG. 6 illustrates an example of the recording setting in which the top-surface sheet discharge is unavailable.

FIG. 5 is a diagram illustrating an example of the selection screen presented to the user. The screen is displayed on the input/output device 166. In the present exemplary embodiment, determination of whether the sheet can be discharged to the sheet discharge destination designated by the sheet discharge destination setting is performed for each page. In addition, before the image of the determined page is recorded, the selection screen illustrated in FIG. 5 is presented to the user, to seek direction. In the present exemplary embodiment, in a case where the top surface is designated as the sheet discharge destination but the recording setting includes the condition in which the top-surface sheet discharge is unavailable, it is determined that the top-surface sheet discharge is unavailable, and the selection screen illustrated in FIG. 5 is displayed. In this case, a message 500 indicating that the sheet cannot be discharged to the top surface, a message 501 indicating an option to "perform recording by changing sheet discharge destination to front surface", and a message 502 indicating an option to "cancel recording job" are displayed. In a case where the user selects the message 501 through the input/output device 166, the sheet discharge destination of the page is changed to the front surface, and the image of the page is recorded. In a case where the user selects the message 502, the subsequent recording job including the page is canceled. In other words, images from the n-th page to the m-th page are not recorded.

The reason why the option to cancel the recording job itself is provided is because, in most of the recording jobs, the recording setting imparted to each of the pages is the same among all of the pages. In a case where the recording setting is the same among all of the pages, even when the recording of the page is canceled and the processing proceeds to recording of a next page, it is determined in determination of the sheet discharge destination of the next page that the top-surface sheet discharge is unavailable in a manner similar to the previous page, and the options are again presented to the user. Therefore, providing the option to cancel the recording job itself eliminates necessity to input an instruction to the options presented by each page, which makes it possible to reduce a load on the user.

FIG. 6 is a table illustrating an example of the recording setting in which the top-surface sheet discharge is unavailable, and it is determined whether the top-surface sheet discharge is available, based on information in the table. In the present exemplary embodiment, the recording job includes the plurality of types of recording setting, and a setting value at which it is determined that the top-surface sheet discharge is unavailable is present in the sheet type setting and the cut mode setting. For example, in the sheet type setting, information indicating that a "regular paper" can be discharged to the top surface but a "thick paper" and a "glossy paper" cannot be discharged to the top surface, is held. This is because, in a case of a sheet having a predetermined thickness or more, conveyance failure may occur in the conveyance path to the top-surface sheet discharge port 2 as described above. Likewise, in the cut mode setting, information indicating that the top-surface sheet discharge is available in the case of the setting to cut the roll sheet but the top-surface sheet discharge is unavailable in the case of the setting not to cut the roll sheet, is held.

In a case where the setting in which the top-surface sheet discharge is unavailable is included in at least one of the conditions statically held, it is determined that the sheet of the page cannot be discharged to the top surface. Note that the recording setting in which the top-surface sheet discharge is unavailable may be previously statically held in the recording apparatus 100 as described above, or may be added or deleted from the input/output device 166 or an external apparatus such as the host computer 190.

Referring back to FIG. 4, in a case where the user selects the option to "perform recording by changing sheet discharge destination to front surface" in step S0405 (YES in step S0405), the sheet discharge destination of the page (n-th page) is changed to the front surface, and the image is recorded in step S0406. In a case where the user selects the option to "cancel recording job" in step S0407 (YES in step S0407), the recording job for all of the n-th and succeeding pages is canceled in step S0407. In step S0409, the recording processing ends. After the image of the n-th page is recorded in step S0402 or S0406, it is determined in step S0408 whether the recording job includes an instruction to record a next page (n+1-th page). In a case where the recording job includes the instruction to record the n+1-th page (YES in step S0408), the processing returns to step S0401. In step S0401, the recording setting of the n+1-th page is determined again, and the processing continues. In a case where the recording job does not include the instruction to record the n+1-th page (NO in step S0408), the processing proceeds to step S0409. In step S0409, the recording processing ends.

As the display of the options to the user and the selection instruction from the user described with reference to FIG. 5, an option to cancel only the corresponding page can be presented, or both the option to cancel only the corresponding page and the option to cancel the corresponding page and subsequent pages may be presented. Further, as the setting of the recording apparatus 100, an option to be selected may be previously determined. In this case, when it is determined that the top-surface sheet discharge is unavailable, the previously determined option is adopted in place of presenting the options to the user every time. The form in which the selection instruction from the user is obtained through the input/output device 166 has been described, however, the selection instruction from the user may be obtained from the external apparatus such as the host computer 190. For example, the host computer 190 may present options similar to the options in FIG. 5, and an option selected by the user may be transmitted to the recording apparatus 100 via the host I/F 127.

As described above, in the present exemplary embodiment, when the job instructing recording is received, it is determined whether the top-surface sheet discharge is available based on the recording setting for each page. Further, in a case where a result of the determination is negative, namely, in the case where it is determined that the top-surface sheet discharge is unavailable based on the recording setting, the user instruction about the recording of the page is received. Such a configuration makes it possible to receive the user instruction about the sheet discharge destination of the recorded product, and to appropriately record the image.

A second exemplary embodiment will be described. In the present exemplary embodiment, holding information to change the sheet discharge destination received from the user makes it possible to switch the sheet discharge destination thereafter without receiving the user instruction, and an instruction input load on the user is reduced. In the following, descriptions of the processing same as the processing in the above-described exemplary embodiment will be omitted.

Figure 7:
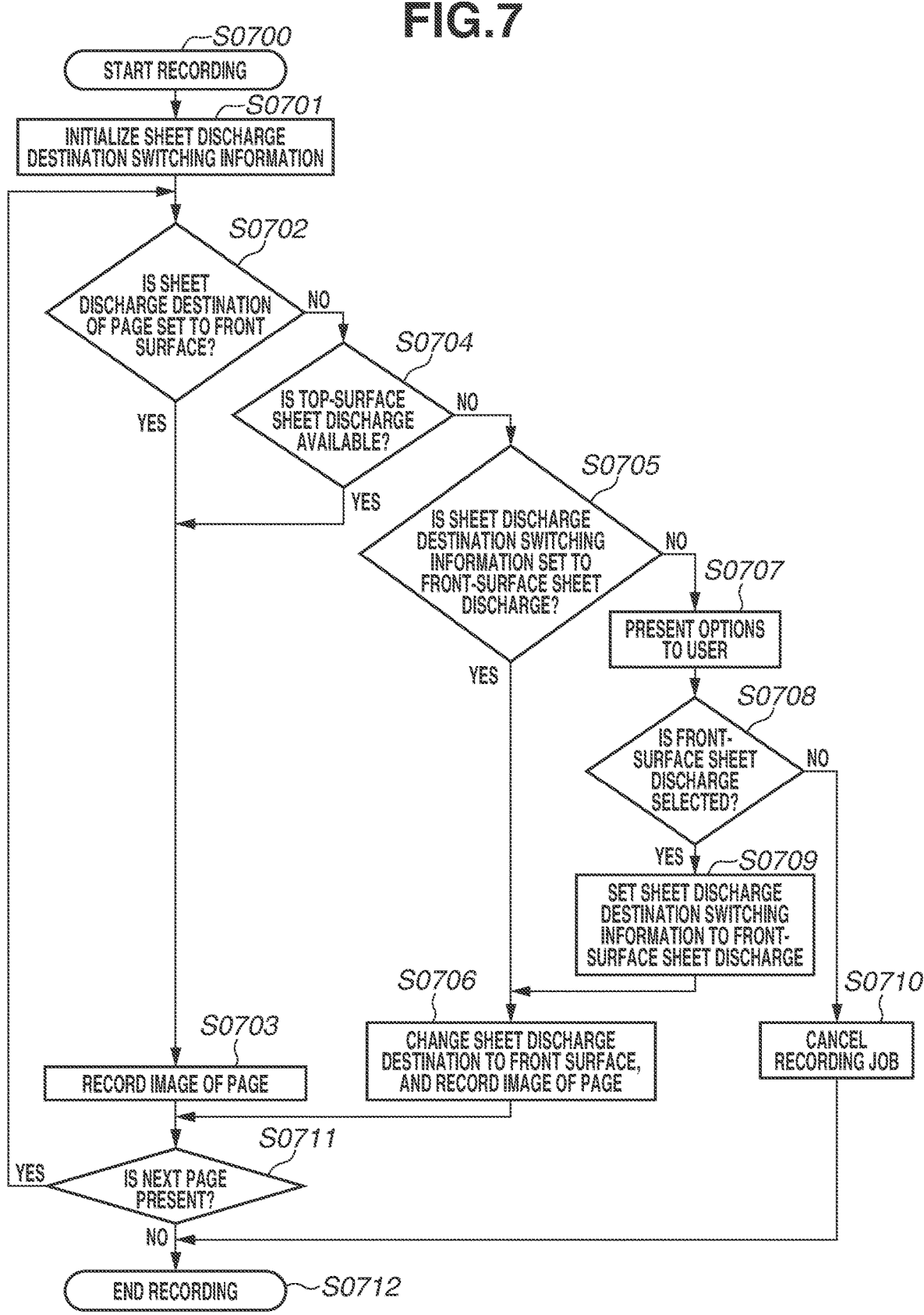
FIG. 7 is a flowchart illustrating processing according to a second exemplary embodiment.

FIG. 7 is a flowchart illustrating processing according to the present exemplary embodiment. In step S0700, when the user operates the input/output device 166 to instruct start of recording, a recording job is acquired and the recording processing is started. First, in step S0701, sheet discharge destination switching information is initialized. The sheet discharge destination switching information is temporary information held in the RAM 124 during execution of the recording job. When the sheet discharge destination switching information is initialized, a state where sheet discharge destination information indicating the top surface or the front surface is not held as the sheet discharge destination switching information is established. Next, in step S0702, it is determined whether the sheet discharge destination of the n-th (n is natural number of 1 or more) page included in the recording job from the user is set to the front surface. In a case where the sheet discharge destination is set to the front surface (YES in step S0702), the sheet can be discharged irrespective of the condition. Accordingly, an image of the page is recorded in step S0703. In a case where the sheet discharge destination is set to the top surface (NO in step S0702), the sheet cannot be discharged depending on a condition included in the recording setting. Therefore, in step S0704, it is determined whether the top-surface sheet discharge is available based on the recording setting. In a case where it is determined that the top-surface sheet discharge is available based on the recording setting (YES in step S0704), the image of the page is recorded in step S0703. In a case where the recording setting includes a condition in which the top-surface sheet discharge is unavailable (NO in step S0704), it is determined in step S0705 whether the sheet discharge destination switching information is set to the front-surface sheet discharge. In a case where the sheet discharge destination switching information is set to the front-surface sheet discharge (YES in step S0705), the sheet discharge destination of the page is changed to the front surface, and the image of the page is recorded in step S0706. In a case where the sheet discharge destination switching information is not set to the front-surface sheet discharge and still has the initial value (NO in step S0705), options are presented to the user in step S0707. In a case where the user selects the front-surface sheet discharge in step S0708 (YES in step S0708), the sheet discharge destination switching information is set to the front-surface sheet discharge in step S0709. Thereafter, in step S0706, the sheet discharge destination of the page is changed to the front surface, and the image of the page is recorded. In a case where the user selects cancel of the recording job in step S0708 (NO in step S0708), the subsequent recording job is canceled in step S0710, and the recording processing ends in step S0712. After the image of the n-th page is recorded in step S0703 or S0706, it is determined in step S0711 whether the recording job includes an instruction to record a next page (n+1-th page). In a case where the recording job includes the instruction to record the n+1-th page (YES in step S0711), the processing returns to step S0702, and the recording processing of the n+1-th page continues. In a case where the recording job does not include the instruction to record the n+1-th page (NO in step S0711), the processing proceeds to step S0712. In step S0712, the recording processing ends.

In the above-described first exemplary embodiment, the user instruction is received at a timing when it is determined that the top-surface sheet discharge is unavailable based on the recording setting for the first time after start of the job; however, the timing is not limited thereto. In a case where all of pages included in the job can be analyzed before recording of a first page, it may be determined whether a page of the recording setting including the condition in which the top-surface sheet discharge is unavailable is present. In a case where the page is present, the user instruction may be received before recording of the first page. In this case, the user instruction is received not during the recording processing of the job, namely, between page recording and page recording, but before recording of the first page immediately after start of the job. Therefore, convenience for the user is high.

As described above, in the present exemplary embodiment, the instruction received from the user is held as the sheet discharge destination switching information. This makes it possible to reduce a burden on the user in relation to selection by the user as compared with a case where the user instruction about the sheet discharge destination of the recorded product is received for each page.

A third exemplary embodiment will be described. In the present exemplary embodiment, after the instruction to switch the sheet discharge destination is received from the user, all of the recorded products of the succeeding pages are discharged to the same sheet discharge destination. Such a configuration makes it possible to suppress deterioration of handleability caused by change in the sheet discharge destination by each page. In the following, descriptions of the processing same as the processing in the above-described exemplary embodiments are omitted.

Figure 8:
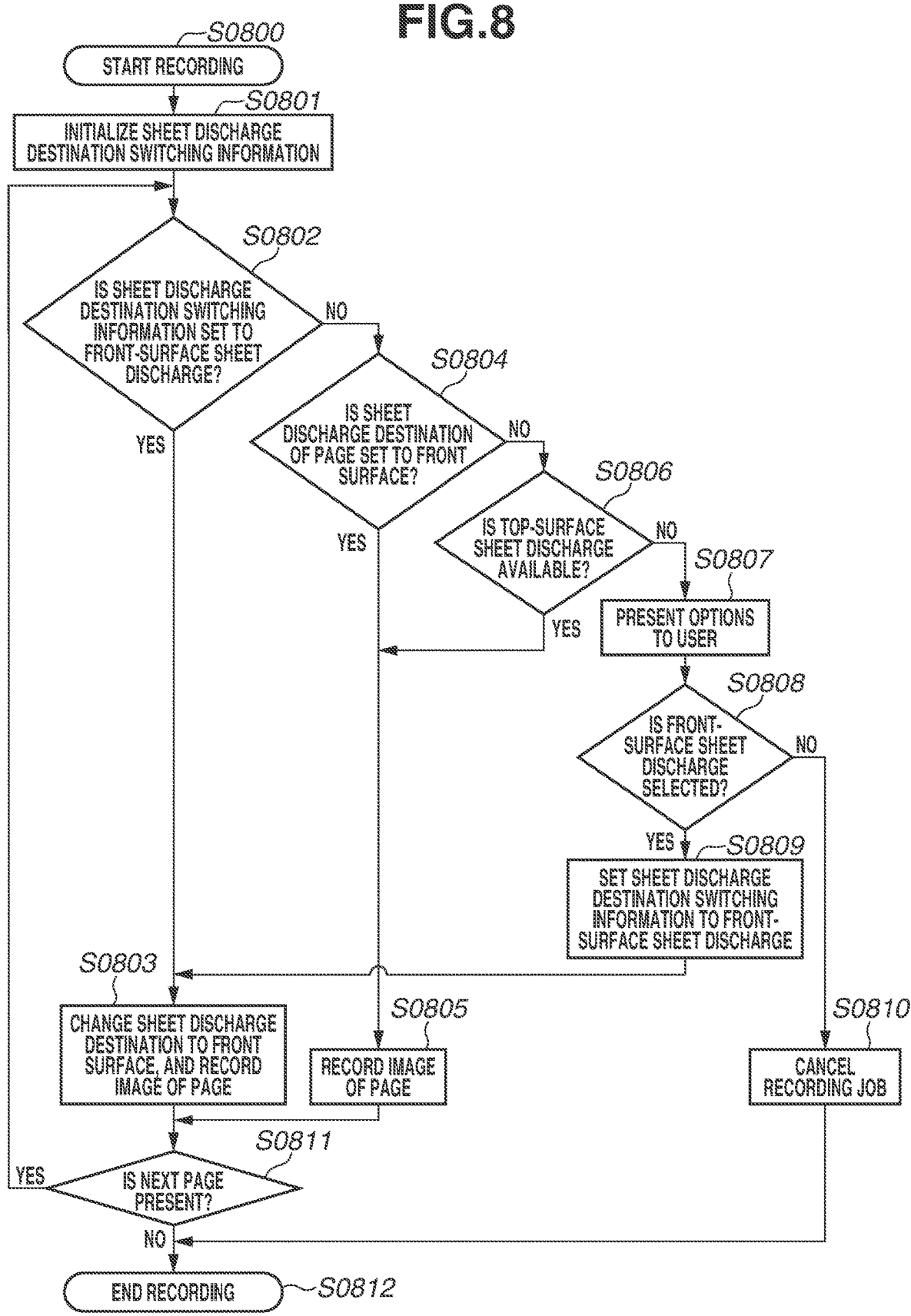
FIG. 8 is a flowchart illustrating processing according to a third exemplary embodiment.

FIG. 8 is a flowchart illustrating processing according to the present exemplary embodiment. In step S0800, when the user operates the input/output device 166 to instruct start of recording, a recording job is acquired and recording is started. First, in step S0801, the sheet discharge destination switching information is initialized. Next, in step S0802, it is determined whether the sheet discharge destination switching information on the n-th (n is natural number of 1 or more) page is set to the front-surface sheet discharge. In a case where the sheet discharge destination switching information is set to the front-surface sheet discharge (YES in step S0802), the sheet discharge destination of the page (n-th page) is changed to the front surface, and the image is recorded in step S0803. In a case where the sheet discharge destination switching information is not set to the front surface sheet discharge and still has an initial value (NO in step S0802), it is determined in step S0804 whether the sheet discharge destination included in the recording job from the user is set to the front surface. In a case where the sheet discharge destination is set to the front surface (YES in step S0804), the image of the page is recorded in step S0805 because the sheet can be discharged irrespective of the condition. In a case where the sheet discharge destination is set to the top surface (NO in step S0804), it is determined in step S0806 whether the top-surface sheet discharge is available based on the recording setting, because the sheet cannot be discharged depending on the condition included in the recording setting. In a case where it is determined that the top-surface sheet discharge is available based on the recording setting (YES in step S0806), the image of the page is recorded in step S0805. In a case where the recording setting includes a condition in which the top-surface sheet discharge is unavailable (NO in step S0806), options are presented to the user in step S0807. In a case where the user selects the front-surface sheet discharge in step S0808 (YES in step S0808), the sheet discharge destination switching information is set to the front-surface sheet discharge in step S0809. Thereafter, in step S0803, the sheet discharge destination of the recording page is changed to the front surface, and the image of the page is recorded. In a case where the user selects cancel of the recording job in step S0808 (NO in step S0808), the subsequent recording job is canceled in step S0810. In step S0812, the recording processing ends. After the image of the n-th page is recorded in step S0803 or S0805, it is determined in step S0811 whether an instruction to record a next page (n+1-th page) is present. In a case where the instruction to record the n+1-th page is present (YES in step S0811), the processing returns to step S0802, and the recording processing of the n+1-th page continues. In a case where the instruction to record the n+1-th page is not present (NO in step S0811), the processing proceeds to step S0812. In step S0812, the recording processing ends.

As described above, in the present exemplary embodiment, after the user selects the sheet discharge destination of the recorded product recorded with the image, all of the recorded products of the succeeding pages are discharged to the same sheet discharge destination. In other words, in place of switching the sheet discharge destination of only the page for which the top-surface sheet discharge is unavailable, all of the recorded products of the succeeding pages are discharged to the same sheet discharge destination after the user selects the sheet discharge destination. This makes it possible to improve handleability while reducing a burden on the user in relation to selection made by the user as compared with a case where the user instruction is received for each page.

A fourth exemplary embodiment will be described. In the present exemplary embodiment, a case where the same recording setting is set to all of the pages in the job and a case where the same sheet discharge destination is designated for all of the pages in the recording setting for the job are described. In these cases, it is possible to apply a result of determination of switching necessity of the sheet discharge destination and the user instruction to all of the pages by performing the determination of switching necessity of the sheet discharge destination and receiving the user instruction only once before recording of the first page instead of performing the determination of switching necessity of the sheet discharge destination and receiving the user instruction for each page. In the following, descriptions of the processing same as the processing of the above-described exemplary embodiments are omitted.

Figure 9:
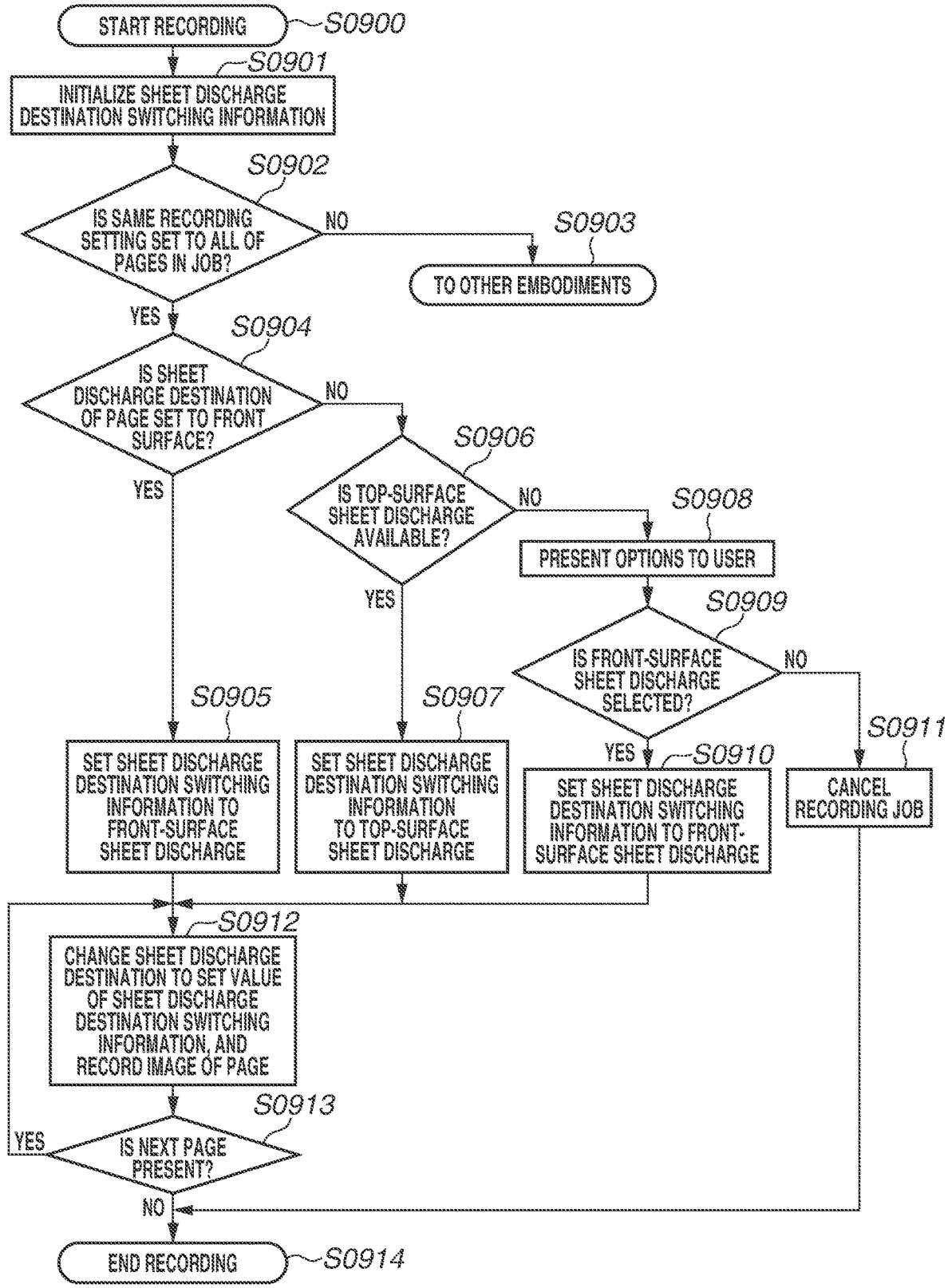
FIG. 9 is a flowchart illustrating processing according to a fourth exemplary embodiment.

FIG. 9 is a flowchart illustrating processing according to the present exemplary embodiment. In step S0900, when the user operates the input/output device 166 to instruct start of recording, a recording job is acquired and recording is started. First, in step S0901, the sheet discharge destination switching information is initialized. Next, in step S0902, it is determined whether the same recording setting is set to all of the pages in the job. This can be implemented by, for example, a method of sequentially determining the recording setting of each of the pages, or a method of preferentially adopting the recording setting for the job over the recording setting for each of the pages. In a case where it is determined in step S0902 that the same recording setting is not set to all of the pages in the recording job (NO in step S0902), the control by each page described in the first exemplary embodiment is performed in step S0903. Thus, description of the subsequent processing is omitted. In a case where it is determined in step S0902 that the same recording setting is set to all of the pages in the job (YES in step S0902), it is determined in step S0904 whether the sheet discharge destination set by the user is the front surface. In a case where the sheet discharge destination is set to the front surface (YES in step S0904), the sheet discharge destination switching information is set to the front-surface sheet discharge in step S0905. In a case where the sheet discharge destination is set to the top surface (NO in step S0904), it is determined in step S0906 whether it is determined whether the top-surface sheet discharge is available based on the recording setting because the sheet cannot be discharged depending on a condition included in the recording setting. In a case where the top-surface sheet discharge is available based on the recording setting (YES in step S0906), the sheet discharge destination switching information is set to the top-surface sheet discharge in step S0907. In a case where the top-surface sheet discharge is unavailable based on the recording setting (NO in step S0906), options are presented to the user in step S0908. In a case where the user selects the front-surface sheet discharge in step S0909 (YES in step S0909), the sheet discharge destination switching information is set to the front-surface sheet discharge in step S0910. In a case where the user selects cancel of the recording job in step S0909 (NO in step S0909), the recording job is canceled in step S0911, and the recording processing ends in step S0914. In a case where the sheet discharge destination switching information is set in step S0905, S0907, or S0910, the image of the n-th page is recorded in step S0912. At this time, the sheet discharge destination is set by using not the sheet discharge destination setting in the recording setting of the n-th page but the sheet discharge destination setting of the sheet discharge destination switching information. After the image of the n-th page is recorded, it is determined in step S0913 whether a next page (n+1-th page) is present. In a case where the n+1-th page is present (YES in step S0913), the processing returns to step S0912, and recording of the image of the n+1-th page continues. In a case where the n+1-th page is not present (NO in step S0913), the processing proceeds to step S0914. In step S0914, the recording processing ends.

As described above, in the present exemplary embodiment, in the case where the same recording setting is set to all of the pages in the job or in the case where the same sheet discharge destination is designated for all of the pages in the recording setting for the job, the determination of switching necessity of the sheet discharge destination is performed and the user instruction is received only once before recording of the first page. Further, the result of the determination and the user instruction are retained and are applied to all of the pages. Such a configuration makes it possible to improve handleability while reducing a burden on the user in relation to selection made by the user as compared with the case where the user instruction about the sheet discharge destination of the recorded product recorded with the image is received for each page.

In the above-described exemplary embodiments, a serial recording apparatus that records an image by alternately performing scanning with the inkjet head in the X direction and sheet conveyance in the Y direction has been described. Alternatively, a full multiple recording apparatus in which the recording position of the inkjet head is fixed and an image is recorded on a conveyed sheet may be used.

Further, the example of the inkjet recording apparatus that records an image by using the inkjet head has been described; however, the recording apparatus is not limited thereto. For example, the exemplary embodiments of the present disclosure are applicable to, for example, an electrophotographic recording apparatus that records an image by using toner.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-179124, filed Oct. 26, 2020, which is hereby incorporated by reference herein in its entirety.

What is claimed is:

1. A recording apparatus comprising:
   a recorder configured to record an image on recording materials;
   a first sheet discharge port and a second sheet discharge port configured to receive discharge of recorded products recorded with the image;
   a processor and a memory configured to be in communication with each other and to perform operations including:
   acquiring a recording job instructing recording of the image,
   determining a determination, and
   receiving an instruction,
   wherein, in a case where sheet discharge destination information included in the recording job indicates the first sheet discharge port as a discharge destination, determining includes determining, before recording the image on an n-th page and based on a recorded product of the n-th page to be output from the recording job, whether the recorded product of the n-th page is dischargeable to the first sheet discharge port, where n is greater than or equal to one, and wherein, in a case where it is determined that the recorded product is not dischargeable to the first sheet discharge port, receiving includes receiving an instruction about recording of the n-th page from a user.

2. The recording apparatus according to claim 1, wherein receiving includes receiving an instruction to discharge the recorded product of the n-th page to the second sheet discharge port or an instruction not to record an image of the n-th page.

3. The recording apparatus according to claim 1, wherein, in a case where the acquired recording job includes m pages, where m is greater than n, receiving includes receiving an instruction not to record images from the n-th page to the m-th page.

4. The recording apparatus according to claim 1, wherein, in a case where the acquired recording job includes m pages, where m is greater than n, receiving includes receiving an instruction to discharge recorded products of the n-th page to the m-th page to the second sheet discharge port.

5. The recording apparatus according to claim 4, wherein the operations further include holding received information where the received information indicates that the recorded products from the n-th page to the m-th page are to be discharged to the second sheet discharge port.

6. The recording apparatus according to claim 1, wherein, among recorded products from the n-th page to the m-th page and in a case where the acquired recording job includes m pages, where m is greater than n, receiving includes receiving an instruction to discharge, to the first sheet discharge port, recorded products of pages determined to be dischargeable to the first sheet discharge port, and to discharge, to the second sheet discharge port, recorded products of pages determined to be undischargeable to the first sheet discharge port.

7. The recording apparatus according to claim 1, wherein, before recording of each of pages of the acquired recording job, determining includes determining whether the recorded product of the n-th page is dischargeable to the first sheet discharge port.

8. The recording apparatus according to claim 1, wherein receiving includes presenting options to the user and receives an instruction about at least one of the presented options.

9. The recording apparatus according to claim 1, wherein determining includes determining whether the recorded product is dischargeable to the first sheet discharge port, based on at least one of: a sheet type or information included in the recording job and indicating whether to cut a sheet.

10. The recording apparatus according to claim 1, wherein the first sheet discharge port is a top-surface sheet discharge portion disposed on a top surface of the recording apparatus above a recording position of the recorder.

11. The recording apparatus according to claim 1, wherein the second sheet discharge port is a front-surface sheet discharge portion disposed at a front surface of the recording apparatus below a recording position of the recorder.

12. A recording apparatus comprising:
a recorder configured to record an image on recording materials;
a top-surface sheet discharge portion to which a recorded product recorded with an image is discharged and disposed at a top surface of the recording apparatus above a recording position where the image is recorded by the recording unit;
a front-surface sheet discharge portion to which a recorded product recorded with an image is discharged and disposed at a front surface of the recording apparatus below the recording position where the image is recorded by the recording unit;
a processor and a memory configured to be in communication with each other and to perform operations including:
acquiring a recording job instructing recording of the image,
determining a determination, and
receiving an instruction,
wherein, in a case where sheet discharge destination information included in the recording job indicates the top-surface sheet discharge port as a discharge destination, determining includes determining, before recording the image on an n-th page and based on a recorded product of the n-th page to be output from the recording job, whether a recorded product of the n-th page is dischargeable to the top-surface sheet discharge port, where n is greater than or equal to one,
wherein, in a case where it is determined that the recorded product is not dischargeable to the top-surface sheet discharge port, receiving includes receiving an instruction about recording of the n-th page from a user, and
wherein receiving includes receiving a user instruction selected from a plurality of options including an instruction to discharge the recorded product of the n-th page to the front-surface sheet discharge portion and an instruction to cancel recording of the n-th page and pages following the n-th page.

13. A method for a recording apparatus having a recorder configured to record an image on recording materials, and a first sheet discharge port and a second sheet discharge port configured to receive discharge of recorded products recorded with the image, the method comprising:
acquiring a recording job instructing recording of the image;
determining a determination; and
receiving an instruction,
wherein, in a case where sheet discharge destination information included in the recording job indicates the first sheet discharge port as a discharge destination, determining includes determining, before recording the image on an n-th page and based on a recorded product of the n-th page to be output from the recording job, whether a recorded product of the n-th page is dischargeable to the first sheet discharge port, where n is greater than or equal to one, and
wherein, in a case where it is determined that the recorded product is not dischargeable to the first sheet discharge port, receiving includes receiving an instruction about recording of the n-th page from a user.

14. A non-transitory computer-readable storage medium storing a program to cause a computer to perform a method for a recording apparatus having a recorder configured to record an image on recording materials, and a first sheet discharge port and a second sheet discharge port configured to receive discharge of recorded products recorded with the image, the method comprising:
acquiring a recording job instructing recording of the image;
determining a determination; and
receiving an instruction,
wherein, in a case where sheet discharge destination information included in the recording job indicates the first sheet discharge port as a discharge destination, determining includes determining, before recording the image on an n-th page and based on a recorded product of the n-th page to be output from the recording job, whether a recorded product of the n-th page is dischargeable to the first sheet discharge port, where n is greater than or equal to one, and wherein, in a case where it is determined that the recorded product is not dischargeable to the first sheet discharge port, receiving includes receiving an instruction about recording of the n-th page from a user.

15. The recording apparatus according to claim 1, further comprising a conveyance path configured to convey the recorded product, wherein, in a case where the sheet discharge destination information included in the recording job indicates the first sheet discharge port as the discharge destination and a rigidity of the recorded product exceeds a predetermined amount relative to a shape of the conveyance path, determining includes determining that the recorded product of the n-th page is not dischargeable to the first sheet discharge port and the recorded product of the n-th page is discharged to the second sheet discharge port.

16. The recording apparatus according to claim 1, further comprising a cutter configured to cut a section from the recording materials to make a page, wherein, in a case where the sheet discharge destination information included in the recording job indicates the first sheet discharge port as the discharge destination and a cut mode setting included in the recording job is set such that the recording materials is not cut by the cutter after the image is recording on the recording materials, determining includes determining that the recorded product of the n-th page is not dischargeable to the first sheet discharge port and the recorded product of the n-th page is discharged to the second sheet discharge port.

17. The recording apparatus according to claim 1, further comprising a database associating recording setting values with availability of the first sheet discharge port to receive the discharge of the recorded products recorded with the image, wherein the recording setting values are based only on a state of a recorded product and determining whether the recorded product of the n-th page is dischargeable to the first sheet discharge port is based on the information included in the acquired recording job and the recording setting values included in the database.

18. The recording apparatus according to claim 17, wherein the database is previously statically held in the recording apparatus.

19. The recording apparatus according to claim 1, further comprising:

a roll sheet supplying apparatus, wherein the recording materials is a roll sheet wound in a roll shape in the roll sheet supplying apparatus; and a cutter configured to cut a section from the roll sheet to make a page, wherein, in a case where the sheet discharge destination of the n-th page is set to the first sheet discharge port, sheet discharge destination switching information is not set to the second sheet discharge port, and the instruction about the recording of the n-th page from the user indicates that the user selects the second sheet discharge port, the sheet discharge destination switching information is set automatically to the second sheet discharge port for the acquired recording job without further input from the user, the discharge destination for the n-th page is changed to the second sheet discharge port, the image of the n-th page is recorded on the roll sheet, and a section from the recording materials by the cutter to make a page that is discharged to the second sheet discharge port.

* * * * *